June 24, 1958     E. E. PACKARD     2,840,245
COUPLER DRAFT KEY RETAINER
Filed Aug. 23, 1954
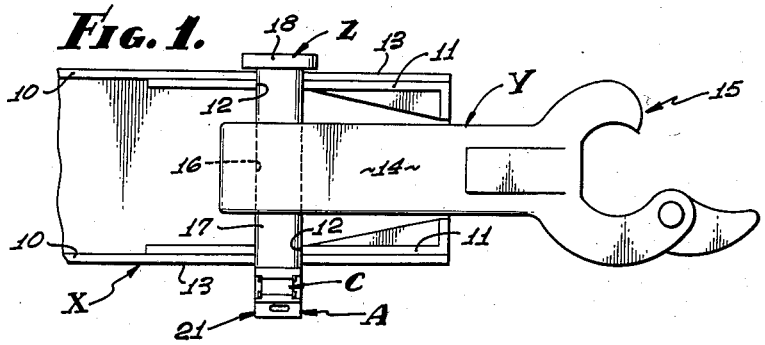
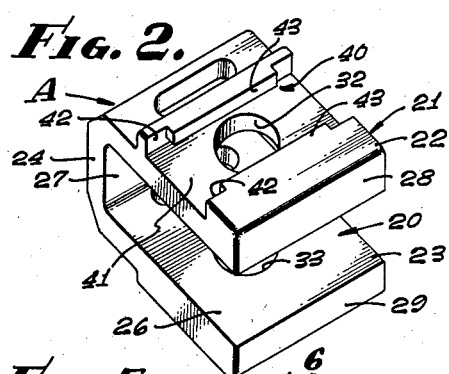
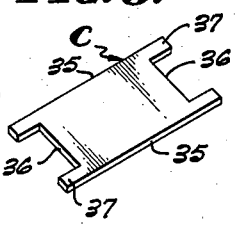
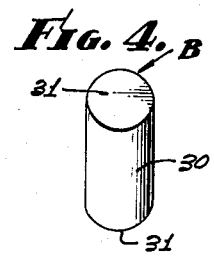
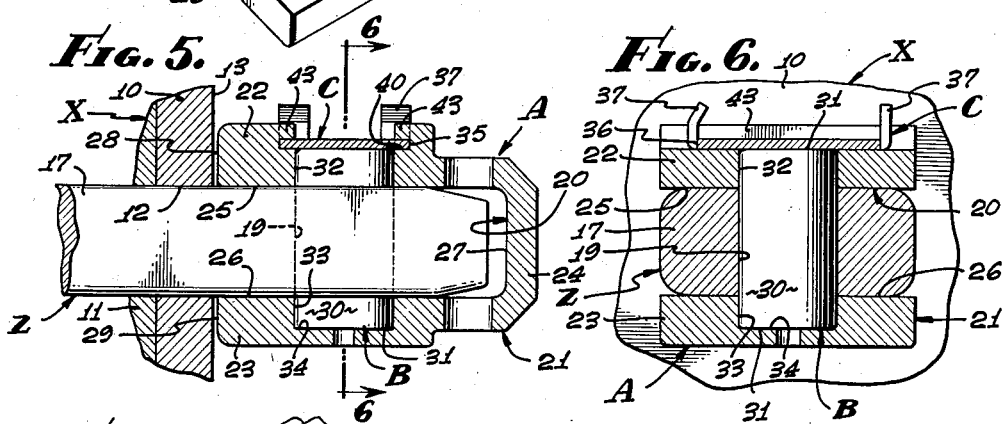
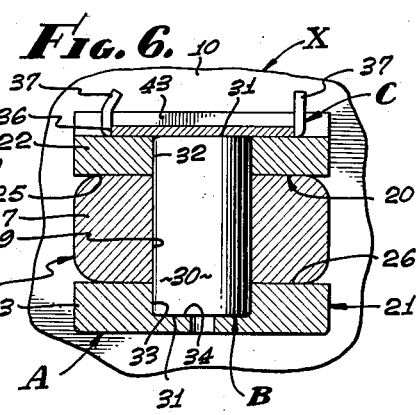
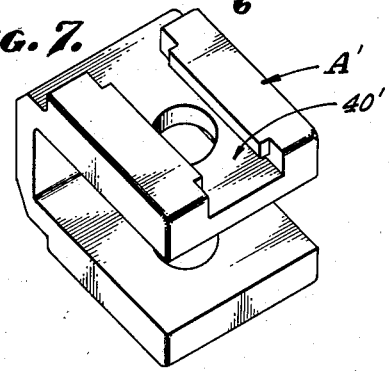
INVENTOR.
ELON E. PACKARD
BY
AGENT.

United States Patent Office 2,840,245
Patented June 24, 1958

2,840,245

COUPLER DRAFT KEY RETAINER

Elon E. Packard, Los Angeles, Calif.

Application August 23, 1954, Serial No. 451,510

12 Claims. (Cl. 213—50.5)

This invention is concerned with a coupler draft key retainer and relates particularly to a head construction for the end portion of a draft key that positively locks the key in operating position. It is an object of this invention to provide a retainer for a coupler draft key that insures proper installation of the draft key with the result that the coupler will not be displaced from its proper working position.

It is very common in the operation of a railroad to have cars "break in two" as a result of the coupler draft key losing its retainer thereby allowing the key to work out leaving no securement for the coupler. With ordinary coupler construction it is required to make frequent inspections of the equipment in order to determine whether or not the draft keys are working out of place. Displacement of the keys may occur for various reasons. For example, with ordinary structures of the character referred to the retainer may be improperly applied, it may become excessively worn in a short period of time due to insufficient bearing surfaces, or it may break due to structural failure of the parts set up in forging process and since the headed portions of pins, and the like, have sharp corners subject to fracturing.

It is an object of this invention to provide a retainer for a coupler draft key which involves few simple parts that are easily and quickly applied without the use of special tools, and the like.

It is another object of this invention to provide a rugged structure of the character referred to which is not subject to mechanical failures and in which large bearing surfaces are provided so that high loads are provided for.

It is also an object of this invention to provide a structure of the character referred to which operates with a minimum amount of wear due to the large bearing surfaces and proper fitting engagement of the parts involved.

It is still another object of this invention to provide a retainer of the character referred to which is simple, inexpensive and reliable and which is easily manufactured, and which is adapted for use on existing railroad equipment.

The various objects and features of my invention will be fully understood from the following detailed description of typical preferred forms and applications of my invention, throughout which description reference is made to the accompanying drawings, in which:

Fig. 1 is a sectional vew of a portion of railroad equipment showing the retainer of the present invention installed on the end portion of a draft key. Fig. 2 is a perspective view of the head of the retainer that I have provided. Fig. 3 is a perspective view of the fastener used in connection with the retainer that I have provided. Fig. 4 is a perspective view of the pin that cooperates with the head that I have provided and which is held in place by the fastener shown in Fig. 3. Fig. 5 is a sectional view showing the retainer applied to the end portion of a draft key. Fig. 6 is a sectional view taken as indicated by line 6—6 on Fig. 5, and Fig. 7 is a view similar to Fig. 2 showing a modified form of construction.

This invention is concerned with a device for positively locking a pin or key in place, particularly the draft key that holds the coupler of a railroad car in proper working position. Fig. 1 of the drawings shows a typical arrangement of parts of more or less standard construction involving a sill or yoke X, a coupler Y and a draft key Z. It is these three elements with which the present invention is primarily concerned.

The sill or yoke X may be considered a structural part of the railroad car and is characterized by side plates 10 that are spaced, vertically disposed, parallel members that extend longitudinally of the railroad car. The end portions of the plates 10 are reinforced with cheek members 11 of conventional construction and aligned openings 12 are provided in and extend through the plates and cheeks on a horizontal axis. The outer sides 13 of the plates 10 are flat and are unobstructed.

The coupler Y is an elongate element and involves a draft tongue 14 and a coupling mechanism 15. The coupling mechanism 15 may be of any suitable construction and the tongue 14 carries the mechanism 15 at the outer end thereof while the inner end of the tongue extends into and between the end portions of the plates 10 of the sill X. The inner end of the tongue 14 is provided with a transverse draft key opening 16 to align with the openings 12 in the plates and cheeks. It will be observed that ample clearance is provided between the tongue 14 and the plates and cheeks 10 and 11.

The draft key Z, as illustrated in the drawings, is of the type in wide use today and is characterized by an elongate flattened shank 17 and a head 18 at one end thereof. The flattened shank has flat upper and lower faces and is provided at the end opposite the head with a pin receiving opening 19. As shown in Fig. 1 of the drawings, the key Z is engaged through the openings 12 and 16 with the head 18 engaged with the outer side 13 of one of the plates 10 while the other end of the key projects from the opposite side 13 of the other plate 10 so that the opening 19 is spaced from the side 13 and is accessible for installation of the retainer of the present invention. It will be apparent how the key holds the coupler Y in operating position relative to the sill or yoke X.

The present invention is concerned with a head and pin unit or retainer that is adapted to be applied to the end portion of the draft key Z having the opening 19 so that the draft key is reliably retained in proper working position. The retainer that I have provided involves, generally, a head A, a pin B and a fastener C. The head A is engaged over and is carried by the end portion of the draft key Z and is adapted to oppose and engage against the side 13 of the plate 10. The pin B is received by the opening 19 in the draft key Z and holds the head A in proper position. And, the fastener C secures the pin B in position so that all of the parts and elements concerned are held in engagement with each other.

The head A is preferably a casting or the like, and is adapted to be applied to the end of the draft key Z. The head A engages over the end portion of the key to enclose the said end portion therof and is, therefore, provided with a recess 20. In the preferred form of the invention and in order to facilitate manufacture the head A is formed of a U-shaped body 21 with the recess 20 open at the sides thereof. As shown throughout the drawings, the body 21 has flat upper and lower arms 22 and 23 that are spaced apart and are parallel with each other to occur adjacent the upper and lower faces of the draft key Z. The arms 22 and 23 are joined at their outer ends by a tie member 24 so that there are parallel walls 25 and 26 at the inner sides of the arms 22 and 23, respectively, and an end wall 27 at the inner side of the tie member 24 defining the recess 20.

It is a feature of this invention that the inner ends of the arms 22 and 23 are provided with flat wearing faces 28 and 29, respectively. The wearing faces 28 and 29 are in a plane normal to the axis of the draft key Z and are engageable against the side 13 of the plate 10. As shown, the parts are preferably proportioned so that there is normally a small amount of clearance between the faces 28 and 29 and the side 13 of the plate 10. It is to be observed that the arms 22 and 23 are joined to the tie member 24 by corners having substantial arcuate fillets so that there is little or no tendency for the parts of the head A to become fractured or to break.

As illustrated in Fig. 4, the pin B is an extremely simple and inexpensive part to manufacture and is not worked nor shaped in any manner that would impair the strength thereof. The pin B is merely a straight cylindrical part having an outer wall 30 and ends 31 normal to the axis thereof.

As best illustrated in Figs. 5 and 6, the pin B is received in the opening 19 in the draft key Z and is engaged through aligned openings 32 and 33 in the arms 22 and 23, respectively. As shown, the opening 32 extends through the arm 22 while the opening 33 is a blind opening or is in the nature of a pocket opening having a bottom 34. It will be apparent that when the pin B is inserted through the opening above referred to, and into supporting engagement with the bottom 34 it is not only carried by but also retains or holds the head A in working position on the end portion of the draft key Z.

The fastener C is shown in Fig. 3 of the drawings and is a simple flat sheet of malleable materials, such as soft iron or steel, and is carried by the head A to close the opening 32 thereby securing the pin B in the openings that handle the pin. The fastener C has straight parallel sides 35 and terminates at ends 36. The fastener in the preferred form of the invention has one or more ears 37 projecting from each of the ends. For example, an ear 37 may project from each side of the fastener at the ends thereof. The ears 37 are easily bent or manipulated as by hammering to hold the fastener in place as hereinafter described.

In accordance with the present invention the head A is provided with means for receiving the fastener C. In Figs. 2, 5 and 6 I have shown the fastener receiving channel 40 of the present invention which extends across the top of the head A. In the preferred form of the invention the channel 40 extends transversely of the head A and is formed in the top side of the arm 22. The channel 40 intersects the opening 32 in the upper arm and has a flat bottom 41 and sides 42 normal to the bottom 41. Guides 43 overlie the bottom 41 at the sides or marginal portions of the channel 40, which guides may terminate at a point spaced inwardly from the sides of the head A. The fastener C is slidably carried in the channel 40 and is held therein by the guides 43 and when in place the ears 37 are turned or bent in a manner to positively hold the fastener in position.

As shown in Fig. 7 of the drawings, the channel 40' may extend longitudinally of the head A' instead of transversely thereof, it being understood that the other details of construction are the same as that above described in connection with the preferred form of the invention.

From the foregoing it will be apparent that I have provided an extremely simple and practical retainer for holding the draft key in working position with relationship to the coupler and sill or yoke of a railroad car. In order to install the device of the present invention the head A is engaged over the end portion of the draft key Z so that the openings are in alignment with each other whereupon the pin B is simply dropped or allowed to fall into the openings. The pin B is positioned and supported within the openings by engaging with the bottom 34 of the lower opening 33. It will be observed that gravity holds the pin in place and that the head cannot be displaced from proper working position. The fastener C is then applied by sliding the fastener into the channel 40 where it is retained by the guides 41. Since the channel 40 intersects the uppermost opening 32 the fastener closes the opening thereby confining the pin B to its working position. The ears 37 on the fastener C may now be bent or deflected in the desired manner so that the fastener cannot be displaced from the channel and head A. The faces 28 and 29 have flat working engagement with the side 13 of the plate 10 and the pin B has ample bearing engagement in the openings 19, 22 and 23.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A coupler draft key retainer including, a head engageable over the end portion of the draft key and having a single opening positioned to align with a single opening through the draft key, a channel in the head intersecting the opening in the head, a straight elongate pin engageable in the openings, and a fastener carried in the channel in the head and closing the opening in the head thereby securing the pin in the openings.

2. A coupler draft key retainer including, a head engageable over the end portion of the draft key and having an opening positioned to align with a single opening through the draft key, a channel in the head intersecting the opening in the head, guides overlying the channel, a straight elongate pin engageable in the openings, and a fastener carried in the channel and engaged with the guides and having deformable ears engageable with the head and closing the opening in the head thereby securing the pin in the openings.

3. A coupler draft key retainer including, a head engageable over the end portion of the draft key and including, spaced arms adapted to overlie the end portion of the draft key and aligned openings in the arms positioned to align with a single opening through the draft key, a channel in one of the arms intersecting the opening therein, a straight elongate pin engageable in the openings, and a fastener carried in the channel in the arm and closing the opening therein and securing the pin in the openings.

4. A coupler draft key retainer including, a head engageable over the end portion of the draft key and including, spaced arms adapted to overlie the end portion of the draft key carried in the channel and a tie member joining the arms, and aligned openings in the arms positioned to align with a single opening through the draft key, a channel in one of the arms intersecting the opening therein, a straight elongate pin engageable in the openings, and a fastener carried in the channel and securing the pin in the openings.

5. A coupler draft key retainer including, a head engageable over the end portion of the draft key and including, spaced arms adapted to overlie the end portion of the draft key, an opening through the first arm and a socket opening in the second arm, said openings being in alignment with each other and positioned to align with a single opening in the draft key, a channel in the first mentioned arm intersecting the opening therein, a straight elongate pin engageable in the openings to be supported in the said socket opening, and a fastener carried in the channel in the arm and closing the opening therein and securing the pin in the openings.

6. A coupler draft key retainer including, a head engageable over the end portion of the draft key and including, spaced arms adapted to overlie the end portion of the draft key, an opening through one of the arms and a socket opening in the other arm, said openings being in alignment with each other and positioned to align with a single opening in the draft key, a channel in the head intersecting the opening in the first mentioned arm, guides overlying the channel, a straight elongate pin engageable in the openings to be supported in the said socket opening, and a fastener carried in the channel and engaged with the guides and securing the pin in the openings.

7. In combination, a car having a coupler engaged between a pair of spaced plate members, a draft key engaged through aligned openings in the coupler and plate members, and a retainer including, a head engageable over the end portion of the draft key and having a single opening positioned to align with a single opening through the draft key, a channel in the head intersecting the opening in the head, a straight elongate pin engageable in the openings, and a fastener carried in the channel in the head and closing the opening in the head thereby securing the pin in the openings.

8. In combination, a car having a coupler engaged between a pair of spaced plate members, a draft key engaged through aligned openings in the coupler and plate members, and a retainer including, a head engageable over the end portion of the draft key and having an opening positioned to align with a single opening through the draft key, a channel in the head intersecting the opening in the head, guides overlying the channel, a straight elongate pin engageable in the openings, and a fastener carried in the channel and engaged with the guides and having deformable ears engageable with the head and closing the opening in the head thereby securing the pin in the openings.

9. In combination, a car having a coupler carried between a pair of spaced vertically disposed plate members, an elongate draft key engaged through aligned openings in the coupler and plate members, and a retainer including, a head engageable over the end portion of the draft key and including, spaced arms adapted to overlie the end portion of the draft key and aligned openings in the arms positioned to align with a single opening through the draft key, a channel in one of the arms intersecting the opening therein, a straight elongate pin engageable in the openings, and a fastener carried in the channel in the arm and closing the opening therein and securing the pin in the openings.

10. In combination, a car having a coupler carried between a pair of spaced vertically disposed plate members, an elongate draft key engaged through aligned openings in the coupler and plate members, and a retainer including, a head engageable over the end portion of the draft key and including, spaced arms adapted to overlie the end portion of the draft key carried in the channel and a tie member joining the arms, and aligned openings in the arms positioned to align with a single opening through the draft key, a channel in one of the arms intersecting the opening therein, a straight elongate pin engageable in the openings, and a fastener carried in the channel and securing the pin in the openings.

11. In combination, a car having a coupler carried between a pair of spaced vertically disposed plate members, an elongate draft key engaged through aligned openings in the coupler and plate members, and a retainer including, a head engageable over the end portion of the draft key and including, spaced arms adapted to overlie the end portion of the draft key, an opening through the first arm and a socket opening in the second arm, said openings being in alignment with each other and positioned to align with a single opening in the draft key, a channel in the first mentioned arm intersecting the opening therein, a straight elongate pin engageable in the openings to be supported in the said socket opening, and a fastener carried in the channel in the arm and closing the opening therein and securing the pin in the openings.

12. In combination, a car having a coupler carried between a pair of spaced vertically disposed plate members, an elongate draft key engaged through aligned openings in the coupler and plate members, and a retainer including, a head engageable over the end portion of the draft key and including, spaced arms adapted to overlie the end portion of the draft key, an opening through one of the arms and a socket opening in the other arm, said openings being in alignment with each other and positioned to align with a single opening in the draft key, a channel in the head intersecting the opening in the first mentioned arm, guides overlying the channel, a straight elongate pin engageable in the openings to be supported in the said socket opening, and a fastener carried in the channel and engaged with the guides and securing the pin in the openings.

References Cited in the file of this patent

UNITED STATES PATENTS

| | | |
|---|---|---|
| 1,114,239 | Downing | Oct. 20, 1914 |
| 1,679,607 | Hoerr | Aug. 7, 1928 |
| 1,996,038 | Blattner | Mar. 26, 1935 |
| 2,477,535 | Wilson et al. | July 26, 1949 |
| 2,605,908 | Smith | Aug. 5, 1952 |